United States Patent
Adrian et al.

[11] Patent Number: 6,089,142
[45] Date of Patent: Jul. 18, 2000

[54] PISTON HEAD FOR A HYDRAULIC SHOCK ABSORBER

[75] Inventors: Adolf Adrian; Dr.-Ing. Rolf Angermann, both of Ennepetal, Germany

[73] Assignee: Krupp Bilstein GmbH, Ennepetal, Germany

[21] Appl. No.: 09/149,592

[22] Filed: Sep. 8, 1998

[30] Foreign Application Priority Data

Dec. 17, 1997 [DE] Germany .......................... 197 55 994

[51] Int. Cl.$^7$ .................................................. B01D 19/00
[52] U.S. Cl. ........................................................ 92/181 P
[58] Field of Search .............. 92/181 R, 181 P, 92/183, 184

[56] References Cited

U.S. PATENT DOCUMENTS

| | | | |
|---|---|---|---|
| 277,305 | 5/1883 | Maltby | 92/183 X |
| 3,827,538 | 8/1974 | Morgan | 92/256 X |
| 5,259,294 | 11/1993 | May | 92/181 P |

FOREIGN PATENT DOCUMENTS 720169  4/1942  Germany .................................. 92/183

*Primary Examiner*—John E. Ryznic
*Attorney, Agent, or Firm*—Max Fogiel

[57] ABSTRACT

A piston (3) for a hydraulic dashpot for motor vehicles, mounted on one end of a piston rod (1) and dividing a cylinder (5) into a two compartments (6 & 7), with two groups of lines (8 & 9) arranged more or less in concentric circles and more or less paralleling the piston rod and conveying hydraulic fluid in opposite directions, and with disk-shaped check valves, to some extent in the form of stacks (15 & 26) of cup springs, at each end that block one group of lines in one direction at a time, whereby the valve that blocks the inner lines (8) comprises either two separated springs (11), one above the other, or a stack (15) of springs, whereby the springs or stack nearer the outlet (10) from the inner lines maintain or maintains one cross-section open for the fluid to flow through, and whereby, when the pressure of the fluid increases, the spring or stack at the other end opens another cross-section for the fluid to flow through and the valve that blocks the outer lines opens intakes into the inner lines. The object is an improved piston with simple means of obtaining a degressive curve in both phases. The valve that blocks the outer lines accommodates a resilient cap (21) that covers their outlets (19) and rests by way of a separated ring (22) against another resilient component at the end facing away from the outer lines.

12 Claims, 1 Drawing Sheet

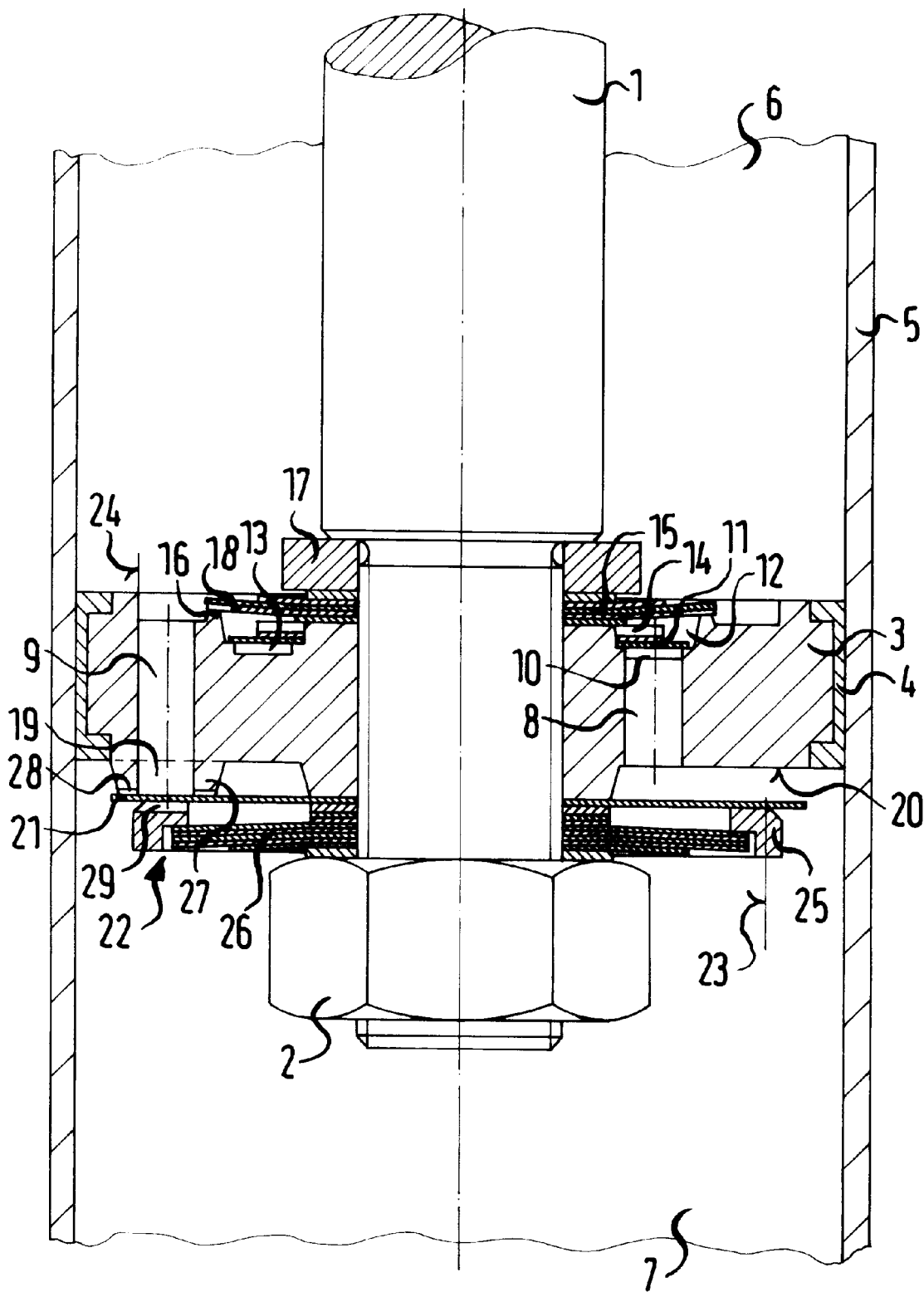

PISTON HEAD FOR A HYDRAULIC SHOCK ABSORBER

The present invention concerns a piston for a hydraulic dashpot for motor vehicles as recited in the preamble to claim 1. To ensure reliable and easy shock absorption in hydraulic dashpots it has been attempted to obtain a degressive absorption-over-speed curve. This has been accomplished through the design and action of the check valves that accommodate the different fluid-conveying lines. Various routes with various types of lines are associated with the various types of piston. These routes differ also with respect to whether the dashpot has one or two cylinders.

In a piston with two groups of fluid-conveying lines arranged more or less in concentric circles and more or less paralleling the piston rod, and with fluid flowing through them in opposite directions, German 3 932 669 proposes providing the inner line with a check valve accommodating two or two stacks of mutually separated cup springs, whereby the spring at the outlet from the inner lines opens one line when the pressure of the fluid is low and the stack above it another line as the pressure increases. The inner lines in such a piston regulate the vacuum phase. To obtain a degressive curve for the compression phase in a two-cylinder in a dashpot of this genus, an additional valve is necessary in the base.

Variably degressive pistons of the aforesaid genus, are not known, however, for single-cylinder dashpots. Instead, multiple pistons with an intake at the center for both the vacuum phase and the compression phase or with lines that slope down into them as described in German 4 139 746 A1 are employed. One drawback is that they are very complicated.

The object of the present invention is an improved piston of the aforesaid genus with simple means of obtaining a degressive curve in both phases.

This object is attained in accordance with the present invention as recited in the body of claim 1. Claims 2 through 11 address advantageous and advanced embodiments. The present invention has several advantages. The piston and the components that operate in conjunction with it are extremely simple and inexpensive. The components, especially the springs and other tensioning components can be interchanged not only to attain a degressive curve on the part of the piston in both phases but also to adapt the shock-absorption properties of a single size of piston to various makes of vehicle, which means keeping essentially less parts in stock and better use of machinery. The piston for the dashpot in accordance with the present invention can also be a one-part sintering and is accordingly simple to produce.

One embodiment of the present invention will now be specified with reference to the accompanying drawing. The single figure is an angularly displaced section through the axis of the dashpot. The outer lines, which operate during the vacuum phase, are shown on the left and the inner lines, which operate during the compression phase, on the right.

A piston 3 for a hydraulic dashpot is screwed onto the threaded end of a piston rod 1. The individual components of the piston are tensioned as an entire assembly against piston rod 1 by a nut 2. The inner circumference of piston 3 rests against the threads on piston rod 1 and an annular seal 4 rests against its outer circumference and against the inner surface of a cylinder 5. Seal 4 separates the interior of the cylinder into two compartments 6 and 7. Two groups of fluid-conveying lines 8 and 9 extend through piston 3, each arranged in a circle and approximately paralleling piston rod 1. One group of lines 8 is inside the other group, of lines 9.

The outlet 10 from inner lines 8 is blocked in the vicinity of piston rod 1 by a cup spring 11. Spring 11 rests in an annular accommodation 12, and closes off an annular header 13 that connects inner lines 8 together. Spring 11 is tensioned by a disk 14 with an undulating circumference and by washers resting on the disk. The section of accommodation 12 that extends above spring 11 is itself blocked by a stack 15 of cup springs. A ridge 16 extends around accommodation 12 and resiliently supports stack 15. An annular spacer 17 centers stack 15 against the narrower piston rod 1. As it enters cylinder 5, piston rod 1 forces fluid out of lower compartment 7 and into upper compartment 6, allowing the fluid to flow through inner lines 8. As long as the pressure in lower compartment 7 is lower than that in upper compartment 6, only spring 11 will rise from its seat, and the fluid will flow only through a bypass 18 in the uppermost spring in stack 15, As the difference between the pressures in compartments 6 and 7 increases, however, stack 15 will also rise off of ridge 16 and provide a larger cross-section for the fluid to flow through.

Outer lines 9 convey fluid from upper compartment 6 to lower compartment 7 as piston rod 1 leaves cylinder 5, during the vacuum phase, that is. The outlets 19 from inner lines 8 are surrounded at the end facing away from piston 3 by a ridge and accordingly extend beyond the bottom 20 of the piston. Fluid can accordingly flow unimpeded out of lower compartment 7 and into inner lines 8.

The outlets 19 from outer lines 9 are covered by a disk-shaped cap 21 with a ring 22 resting on it. The outside diameter 23 of the portion of ring 22 resting on cap 21 is shorter than the outermost contour 24 of outer lines 9. The side of ring 22 facing away from cap 21 is surrounded by an elevation 25, providing the ring with an L-shaped cross-section. Inside elevation 25, a stack 26 of cup springs is tensioned against ring 22 from outside. All the components that operate in conjunction with piston 3 are as aforesaid combined into a single assembly by nut 2. Various unillustrated annular separators are positioned between the various disks, springs, caps, etc. and piston 3 and between piston rod 1 and nut 2.

When the pressure in upper compartment 6 begins to become slightly higher than the pressure in lower compartment 7, while the piston rod 1 is establishing a vacuum phase, that is, cap 21 will rise slightly off certain ridge-like elevations 27 around the outlet 19 from outer lines 9. Once the difference between the pressures in compartments 6 and 7 is considerable, however, cap 21 will be able to rise higher above ring 22 against the tension exerted by stack 26, opening a wider cross-section for the fluid to flow through.

Ridge-like elevation 27 can be circular, elliptical, rectangular etc. depending on the contour of outer lines 9. It is also conceivable for ridge-like elevation 27 to surround two or more individual fluid-conveying lines 29. The cross-sections of both the inner lines 8 and the outer lines 9 can also be of any shape.

One or more of the elevations 27 around the outlets 19 from outer lines 9 is provided with one or more always open bypasses 28. Bypasses 28 are intended to allow a little fluid to always flow through the piston without being blocked by the check valves in order to compensate for slight differences in pressure, which is diminished by the valve's tendency to flap back and forth during high-frequency and low-amplitude vibrations.

Just replacing the cup springs 11 and caps 21 with thicker or thinner ones, the springs in stacks 25 and 26 with more or less springs, or the separators with thicker or thinner separators will extensively vary the height and shape of the dashpot's performance curve in both the compression and the vacuum phases. The same dashpot with the same piston rod, cylinder, and piston can accordingly be employed in a wide range of vehicle makes.

At least one radial pressure-releasing vent 29 between the inside of ring 22 between cap 21 and stack 26 of cup springs ensures hydraulic-pressure reduction.

List of Parts 1. piston rod
2. nut
3. piston
4. annular seal
5. cylinder
6. upper compartment
7. lower compartment
8. inner hydraulic fluid conveying lines
9. outer hydraulic fluid conveying lines
10. outlet
11. cup spring
12. accommodation
13. annular header
14. undulating disk
15. stack of cup springs
16. ridge
17. annular spacer
18. bypass
19. outlet
20. bottom
21. cap
22. ring
23. outside diameter
24. outermost contour
25. elevation
26. stack of cup springs
27. ridge-like elevation
28. bypass
29. pressure-releasing vent

What is claimed is:

1. A piston for a hydraulic dashpot for motor vehicles, comprising: a piston rod, piston being mounted on one end of said piston rod; a cylinder divided into a two compartments by said piston, two groups of lines arranged paralleling said piston rod and conveying hydraulic fluid in opposite directions; disk-shaped check valves, substantially in form of stacks of cup springs, at each end blocking one group of lines in one direction at a time; one of said valves blocking inner ones of said lines comprising two separated springs one above the other or a stack of springs, a plurality of said springs at one end being nearer an outlet from said inner lines maintaining one cross-section open for fluid to flow through, when pressure of said fluid increases a plurality of said springs at the other end opening another cross-section for said fluid to flow through and one of said valves blocking outer ones of said lines and opening intakes into said inner lines; a resilient cap covering outlets of said outer lines accommodated by the valve blocking said outer lines; a resilient component at an end facing away from said outer lines, said resilient cap resting against said resilient component by way of seperated spring.

2. A piston as defined in claim 1, wherein said resilient cap is circular.

3. A piston as defined in claim 1, wherein said resilient cap has a finger-shaped circumference.

4. A piston as defined in claim 1, wherein said seperated ring has at least one radial pressure-releasing vent.

5. A piston as defined in claim 1, wherein said resilient component comprises a cup spring.

6. A piston as defined in claim 1, wherein said resilient component comprises a stack of cup-springs.

7. A piston as defined in claim 1, including an open bypass in vicinity of at least one of said outlets from at least one of said groups of said lines, said lines being hydraulic-fluid conveying lines.

8. A piston as defined in claim 7, wherein said resilient component comprises a stack of cup-springs with an uppermost cup-spring, said bypass being in an uppermost cup-spring.

9. A piston as defined in claim 7, wherein said bypass is in said resilient cap.

10. A piston as defined in claim 8, wherein said uppermost cup-spring is tensioned concave.

11. A piston as defined in claim 1, wherein said resilient cap is tensioned concave.

12. A piston as defined in claim 1, wherein an outlet from said outer lines has a ridge around it, said outer lines comprising hydraulic-fluid conveying lines.

* * * * *